United States Patent [19]

Paterno et al.

[11] Patent Number: 5,636,271
[45] Date of Patent: Jun. 3, 1997

[54] SECURITY CODE SELECTOR FOR TELEPHONE ACCESS CARD

[75] Inventors: Gregory J. Paterno; Patricia D. Croxell, both of Plano, Tex.

[73] Assignee: MCI Corporation, Washington, D.C.

[21] Appl. No.: 490,448

[22] Filed: Jun. 14, 1995

[51] Int. Cl.[6] .................................. H04M 1/00
[52] U.S. Cl. ................ 379/355; 379/354; 379/357; 379/145
[58] Field of Search .................. 379/355, 354, 379/356, 357, 216, 433, 144, 145, 114; 235/379, 380

[56] References Cited

U.S. PATENT DOCUMENTS

| 5,181,238 | 1/1993 | Medamana | 379/95 |
| 5,181,744 | 1/1993 | Betheil | 379/355 |
| 5,343,519 | 8/1994 | Feldman | 379/355 |
| 5,365,046 | 11/1994 | Haymann | 235/380 |
| 5,377,263 | 12/1994 | Bazemore | 379/355 |
| 5,511,114 | 4/1996 | Stimson et al. | 379/144 |

*Primary Examiner*—Krista M. Zele
*Assistant Examiner*—Jacques M. Saint-Surin

[57] ABSTRACT

A card for tonal entry of PIN codes into a telephone is provided. The keys of a key entry device are contacted in a proscribed sequence to enter a number into the card with each use of the card. The keyed in number is compared with a number stored in the card. If the numbers are the same, an acknowledgement tone is sent. Upon obtaining of the acknowledgement tone, the annunciator in the card is held to the telephone mouthpiece and activated by the user to produce a tonal representation of the PIN number. If an improper number sequence is keyed in by the user, the card produces a warning signal requiring reentry of a number. After three or four successive failures of the user to enter the correct number, the card is disabled and a new one has to be obtained by the cardholder.

15 Claims, 4 Drawing Sheets

SECURITY CODE SELECTOR FOR TELEPHONE ACCESS CARD

FIELD OF THE INVENTION

The present invention relates to providing security for Personal Identification Numbers (PINs) in connection with their use over the telephone and more particularly, to tone generators for generating audible telephone tone signals to enter PINs into a telephone system through the mouthpiece of a telephone.

BACKGROUND OF THE INVENTION

Theft of services and goods has increased with the use of telephone access cards to credit telephone calls and the use of credit and other cards to obtain access by phone to personal accounts and to order goods. Unscrupulous observers, to obtain unauthorized access to phone services and credit accounts, will memorize card and PIN numbers while they are being entered either verbally through the mouthpiece of a phone or by keying them in with touchtone phone keys.

One way of avoiding exposure of card and PIN numbers is to use a portable autodialer. A portable autodialer can be a credit card sized device that can be kept in a wallet or pocketbook. They generate audible dial tone multifrequency (DTMF) signals for telephone and card numbers stored in the card for introduction into the mouthpiece of a telephone. There has been increased interest in autodialers with the increased use of telephone access cards. A standard telephone number has seven digits. A long distance telephone number has up to eleven digits. International dialing may require fourteen digits to access an overseas phone. Furthermore, a telephone access or credit card may have fourteen to sixteen digits. It is quite easy to miskey one of the many numbers that are required to be entered necessitating reentry of a long string of numbers.

The use of an autodialer eliminates the need for keying in large strings of numbers into a phone. The card and telephone numbers are stored in the autodialer. Just a few keystrokes are needed to activate the autodialer and select the correct telephone number. Once the autodialer is activated and the number selected, the card is held against the mouthpiece to enter the information in the form of DTMF tones into the telephone.

U.S. Pat. No. 5,377,263, filed Dec. 29, 1992 and entitled "Telephone Dialer Card" and U.S. Pat. No. 5,343,519, filed Sep. 7, 1993 and entitled "Autodialer with Pin Feature" disclose autodialers that transmit PIN numbers along with telephone access and credit card numbers. In both of these patents, the autodialers contain preprogrammed PIN numbers which are transmitted upon appropriate activation of the card. While such an arrangement prevents the previously mentioned unscrupulous observer from overhearing or seeing the numbers being entered, loss or misappropriation of the card can result in its unauthorized use. Furthermore, storing both card and pin numbers in the same device therefore obviates the intended advantage of having separate card and PIN numbers.

BRIEF DESCRIPTION OF THE INVENTION

In accordance with the present invention, a card for audible entry of pin codes into a telephone is provided. This card does not have the disadvantage of the mentioned prior art autodialers. While the audible tone sequence for the PIN number is preprogrammed in the card, the keys of a key entry device on the card have to be contacted in a proscribed sequence before the DTMF tones can be entered into a phone mouthpiece. The keyed in sequence is compared with one stored in the card. If they are the same, a distinct acknowledgement tone is sent. Upon obtaining of the acknowledgement tone, the annunciator in the card is held to the telephone mouthpiece and activated by the user to produce the DTMF tone representation of the PIN number. If an improper sequence is keyed in by the user, the card produces a distinct warning signal and requires reentry of the proscribed keying sequence. After say three or four successive failures to enter the proscribed sequence, the card is disabled and a new one has to be obtained.

Therefore, it is an object of the present invention to provide secure entry of PIN codes into the telephone.

It is a further object of the invention to provide a telephone access card with an audible entry device for entering PIN codes.

It is another object of the invention to provide an autodialer with features that minimize the possibility of unauthorized use of the autodialer in case of loss or theft.

BRIEF DESCRIPTION OF THE DRAWINGS

For a better understanding of the present invention, reference should be had to the following detailed description read in connection with the accompanying drawings, of which.

DETAILED DESCRIPTION

Figure 1:
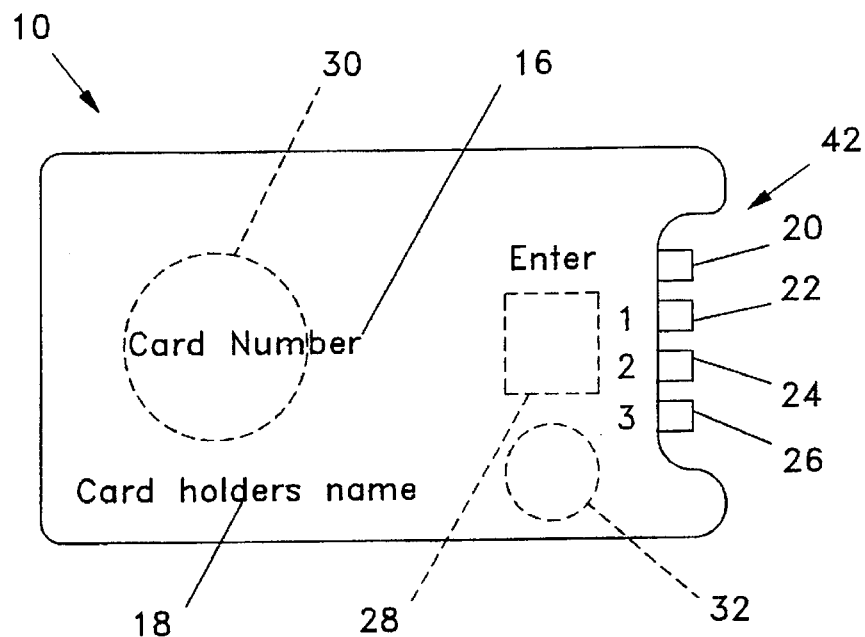
FIG. 1 is a plan view of one side of a telephone access card incorporating the present invention.
Figure 2:
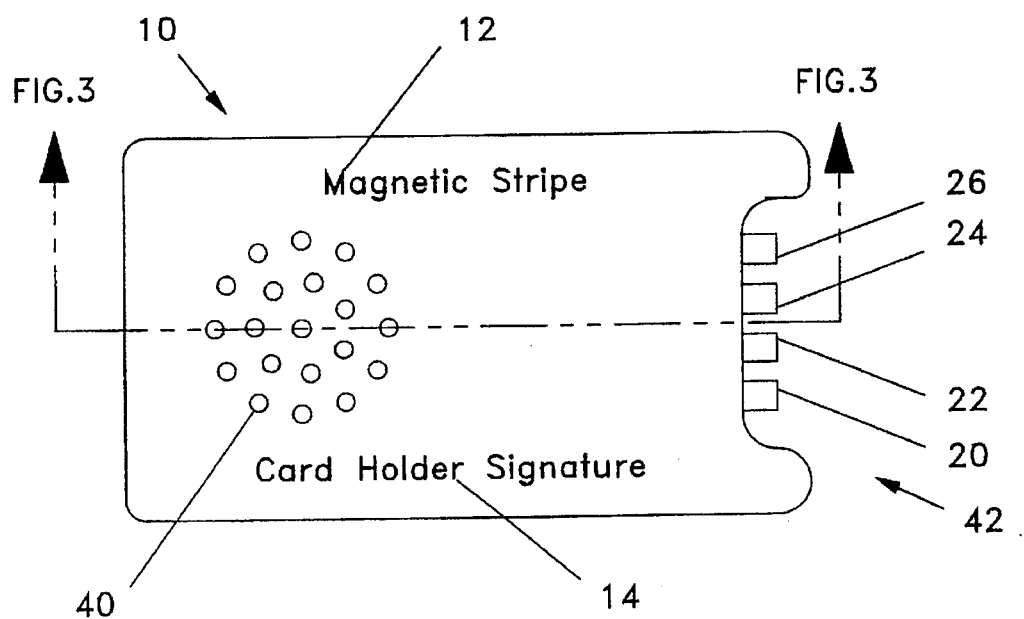
FIG. 2 is a plan view of the other side of the telephone access card shown in FIG. 1.
Figure 3:
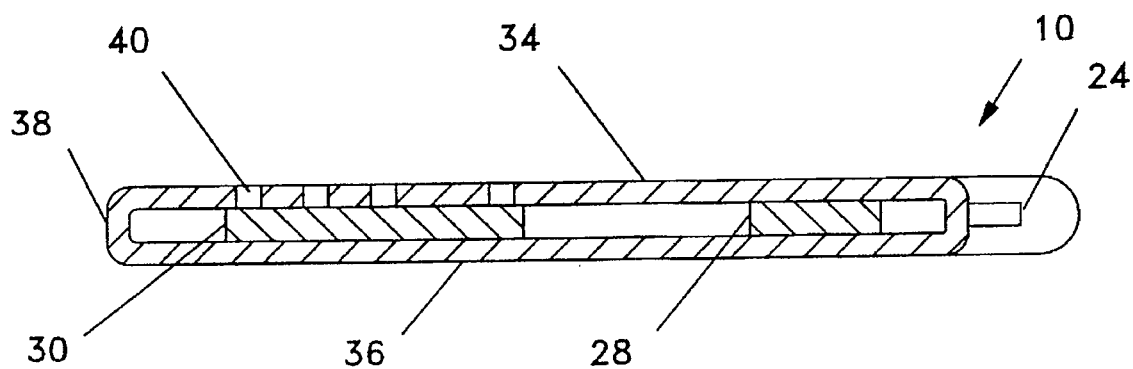
FIG. 3 is a sectional view of the card taken along line 3—3 in FIG. 2.

Referring to FIGS. 1 to 3, the back of a telephone access or credit card 10 is provided with a magnetic strip 12 for machine reading of the card number. The card 10 also contains an area 14 for the cardholder's signature. The card number 16 is embossed in Arabic numerals on the front of the card along with the cardholder's name 18 in Roman letters for use in imprinting the names on credit card slips and for reading numbers in key entry of the card's number into a telephone.

In accordance with the present invention, such a card is provided with a mechanism to permit a DTMF tonal entry of the card PIN number into a telephone mouthpiece. The mechanism includes buttons or keys 20 to 26 for entering a multidigit acknowledgement security code number into the card 10, a microchip 28 for performing logic functions and generating tone signals, a transducer 30 for producing the DTMF tones in response to microchip signals and a battery 32 for powering the microchip 28 and transducer 30.

As shown best in FIG. 3, the card is made of two sheets, 34 and 36, of plastic joined around the edges to form a cavity 38 therebetween. The logic microchip 28, the transducer 30 and the battery 32 are positioned in the cavity with the transducer 30 underneath openings 40 in the plastic backside 36 of the card 10 to permit the audible output of the transducer 30 to be transmitted into the mouthpiece of a phone receiver when placed over the mouthpiece. The transducer 30 is protected from outside contaminants by a thin clear plastic covering between it and the openings 40.

The buttons 20 to 26 are contained in a recess 42 in one edge of the card 10 to minimize activation of the acknowledgement security feature during handling.

Figure 4:
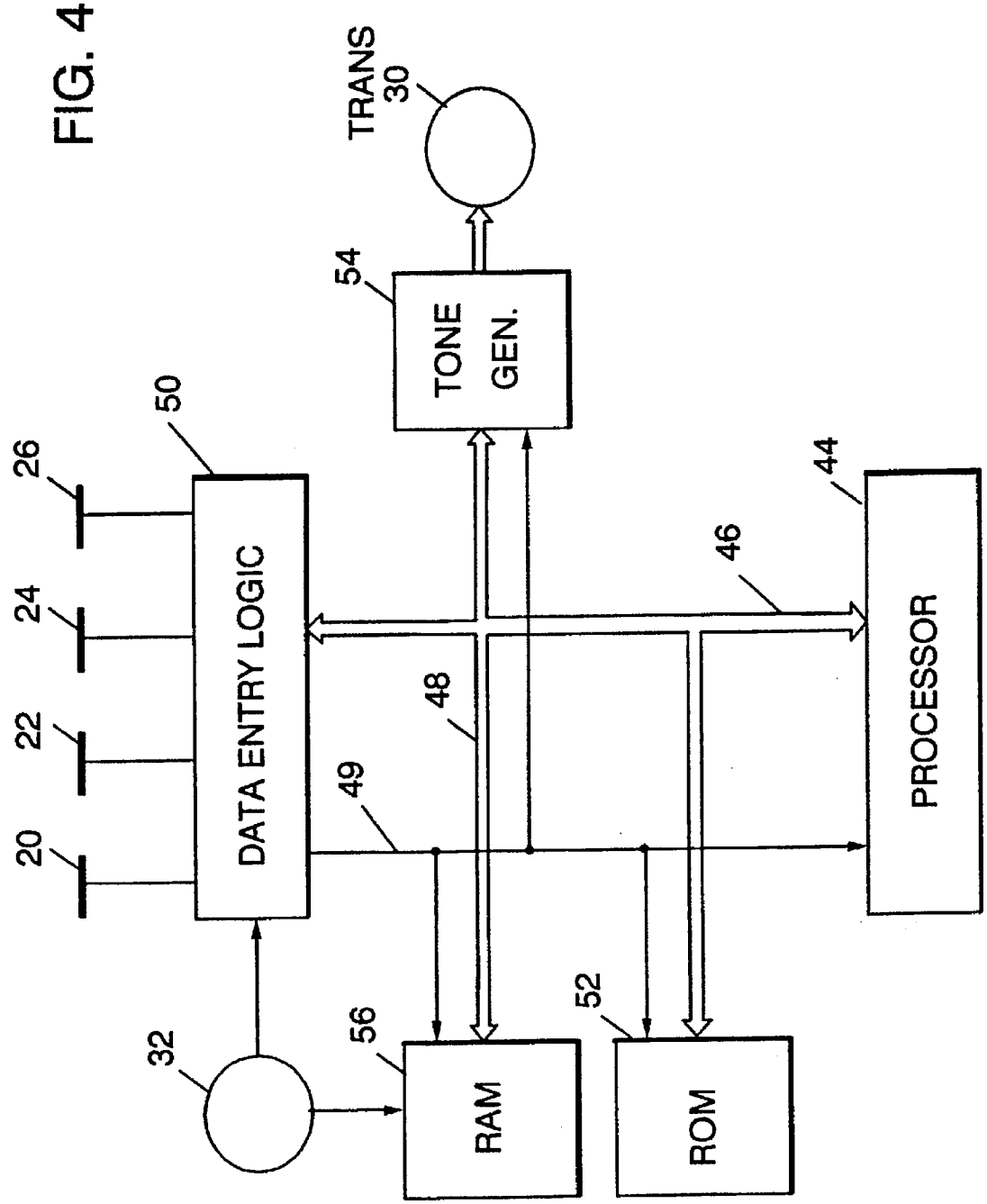
FIG. 4 is a block diagram of the circuitry of the telephone access card shown in FIGS. 1 to 3.

As shown in FIG. 4, the microchip 28 contains a processor 44 to control the functioning of the autodialer. The processor 44 is connected to the other circuit elements on the microchip 28 by both a data bus 46 and address bus 48. Data entry logic 50 provides hexadecimally coded signals to the processor 44 on depression of the buttons 20 to 26. The data entry circuit also makes and breaks a connection 49 to the battery 32 in response to depression of the start key 20 and signals from the processor 44, respectively.

The read only memory (ROM) 52 stores a hexadecimal representation of each of the buttons 22 to 26. As the keys 22 to 26 are depressed, the processor accesses the hexadecimal representations stored in the ROM in order of the proper entering sequence, comparing each stored hexadecimal signal with the one generated by depressing one of the keys.

While there is only three buttons or keys for entering the PIN number, the correct entering sequence can involve depressing one or more of the keys more than once. There is no limit on how many times one of the buttons or keys is to be used in matching the correct entering sequence. In a five digit entering sequence, one key could be required to make all entries. It depends upon the hexadecimal numbers stored in the ROM 52 as the correct entering sequence. If all are identical, the same key must be depressed five times to generate the appropriate tone from the transducer 30.

The ROM 52 is also used to store instructions for the processor. Random access memory (RAM) 56 is also used to store instructions; to temporarily store keyed in data; and to store results of the comparisons. As shall be seen hereafter, a running count of the number of times the wrong sequence has been entered is also kept in the RAM 56. The RAM 56 is powered at a low level sufficient to retain stored data and instructions while the card is not in use. The remaining circuitry is activated through circuit 49 only upon pressing the enter key 20.

Figure 5:
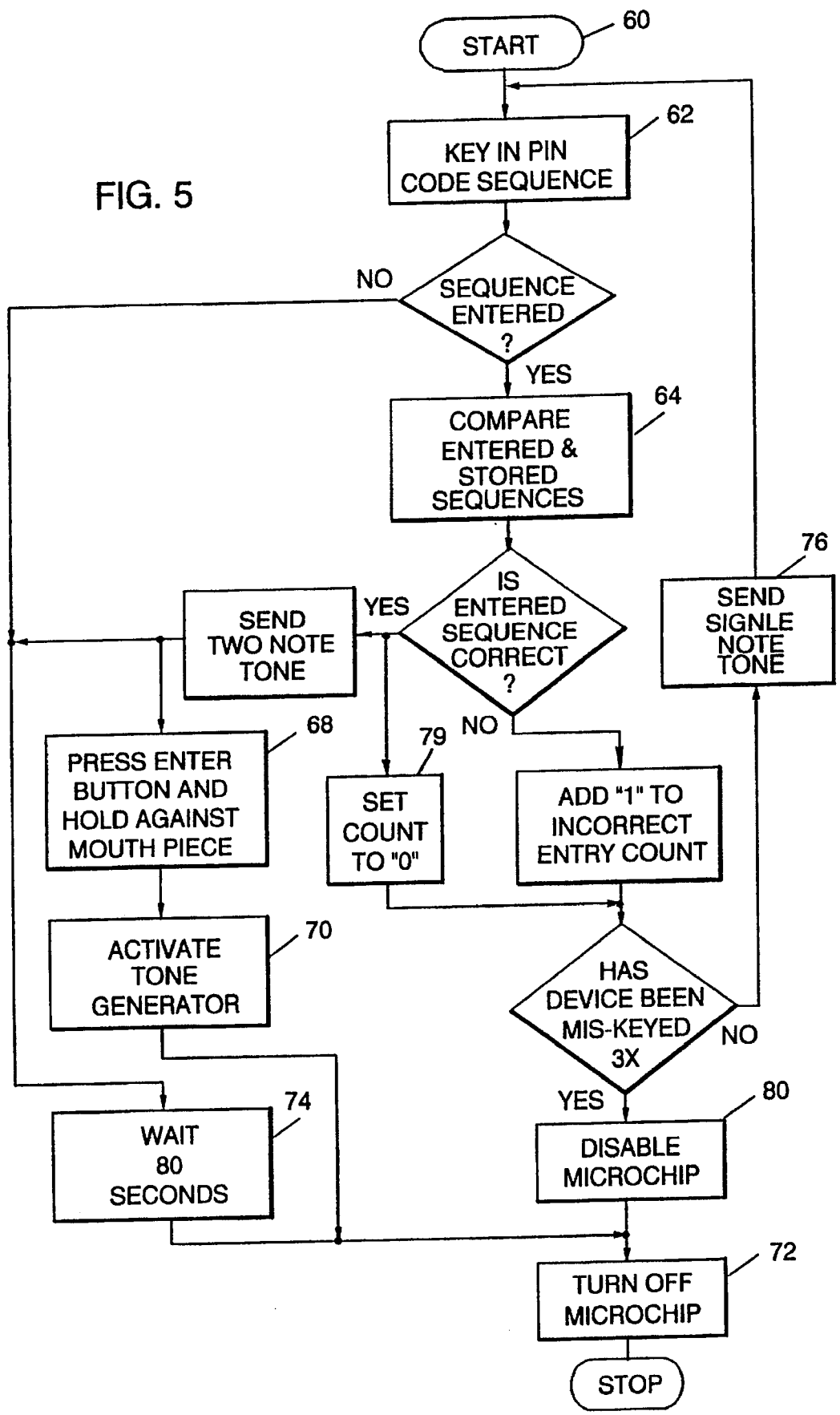
FIG. 5 is a logic flow diagram of the circuitry shown in FIG. 4.

Referring now to FIG. 5, the enter key 20 is depressed 60 to energize the microchip 28 from the battery 32. The cardholder then enters his assigned keying sequence 62. While the keys are numbered on the card 10 to facilitate entering the acknowledgement security code, that numbering does not necessarily reflect the actual PIN number of the cardholder. As each key is depressed, the processor 44, in step 64, compares the hexadecimal representation produced by the key activation with the appropriate hexadecimal number of the sequence stored in the ROM 52. If there is a match with all numbers in the entering sequence with the correct sequence, the processor 44 sends an instruction from the ROM 52 to the tone generator 54 to produce a distinctive two tone note 66 informing the cardholder that the correct sequence was entered. The cardholder then holds the openings 40 in the card 10 against the telephone mouthpiece and presses the enter button per step 68. With this second pressing of the start button, the processor instructs the tone generator in step 70 to transmit the correct DTMF tonal representation of the cardholders PIN number. After the PIN number has been audibly transmitted, per step 72, the processor instructs the data entry logic 50 to interrupt power from the battery to the microchip shutting down the system.

If the cardholder does not activate the enter button in step 68, the processor waits 30 seconds in step 74 and instructs the data entry logic 50 to shut off the autodialer in step 72 as heretofore described. The proscribed entry sequence must then be repeated.

If the buttons 22 to 26 are depressed in an incorrect sequence, the processor 40 instructs the tone generator to provide a distinctive single note tone 76 which indicates to the cardholder that he has pressed the buttons in the wrong sequence and must try again. The processor counts the number of successive failures and keeps the total in RAM 56 in step 78. If the correct sequence is entered, the processor zeros the count. When three successive failures have occurred, the processor permanently disables the microchip in step 80 and the cardholder must then obtain a new card with a different PIN number and button code sequence from the card issuer. The card can be disabled by the processor erasing one of the executable instructions in RAM 56 used to compare the keyed in sequence with the proper sequence.

The requirement that the cardholder press the buttons 22 to 26 in the correct sequence and the provision for the self destruction of the card after three or four successive failures to activate the buttons in the proper sequence, minimize the possibility of unauthorized use. If a user has to press the correct sequence of four keys without knowledge of the correct sequence, there is a 1 in 729 chance that he will hit on the correct sequence the first time. With three chances to enter the sequence correctly, there is a 1 in 243 chance that the correct sequence can be entered before the card is permanently disabled.

Figure 6:
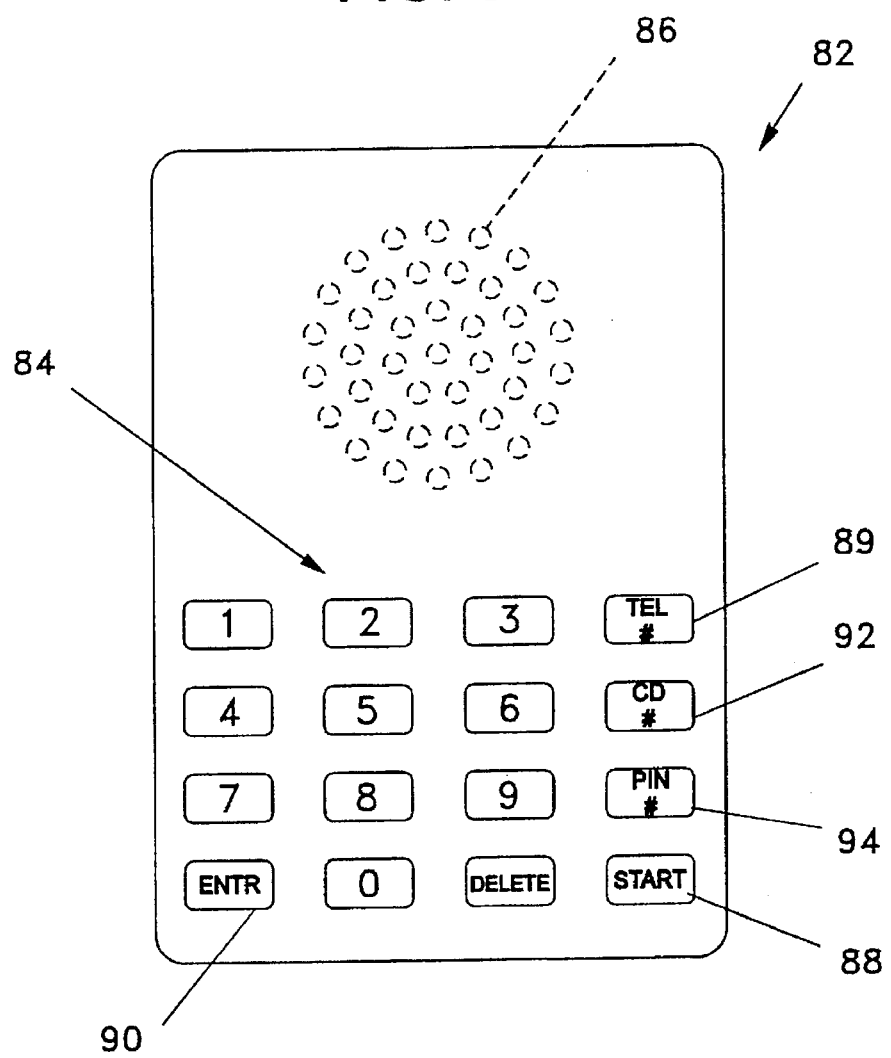
FIG. 6 is a plan view of a phone autodialer incorporating the present invention.

FIG. 6 shows an autodialer having the acknowledgement security code feature of the present invention. The autodialer may be larger than a credit card and could be the size of a small hand held calculator. The autodialer 82 on one face contains a 10 digit touch sensitive entry panel with 6 control keys, and in the opposite face apertures 84 where the transducer is located. The microchip required for this autodialer 82 is substantially the same as that shown in FIG. 4. With this arrangement, telephone numbers can be stored in RAM 56 and the card number permanently stored in ROM 52. Upon pressing the start, telephone and enter buttons 88, 89 and 90 in that order, the telephone numbers can be thereafter keyed into RAM. Once the number has been entered, the enter key is hit again. With the telephone number in memory, it can be retrieved for audible entry into the system by pressing the start button 88, followed by the telephone # button 89 and one of the 10 numbered buttons.

The telephone access card number is permanently stored in ROM 52. For entry of the card number into the telephone system, the card # button 92 is depressed, when requested, after the telephone number has been audibly transmitted. After the card number has been entered into the mouthpiece, the PIN number is requested. The operation for entering the PIN number is the same as that described in connection with the embodiment of FIGS. 1 to 5 with the exception that the PIN # button 96 is depressed instead of the enter button 20 of the card 10 in FIGS. 1 to 3 to enter the sequence and activate the audible sounds.

Above we have described two embodiments of our invention to illustrate the invention, its fabrication and operation. Obviously, many changes in these embodiments will be apparent to those skilled in the art. Therefore, it should be understood that the invention may otherwise be embodied without departing from the spirit and scope of the following claims.

We claim:

1. An access card requiring the use of two number sequences to access an account over a telephone, one of said number sequences being a personal identification number, said access card comprising:
   a) tone generating means within the access card for entering a tonal representation of said personal identification number into a phone;
   b) a set of keying element means each keying element means producing a different numerical signal when contacted, one or more of said keying element means being required to be contacted in a proscribed sequence to have the tone generating means produce said tonal representation, and
   c) logic means for determining whether said one or more of said keying element means have been contacted in or out of said proscribed sequence and activating said tone generating means to produce said tonal representation only if said keying element means have been contacted in said proscribed sequence.

2. The access card of claim 1 wherein said logic means includes:
   a) counting means for counting successive failures to contact the keying elements of said set in the proscribed sequence; and
   b) means for disabling said card to prevent it from producing said tonal representation after a preset number of said successive failures.

3. The access card of claim 2 wherein said logic means includes:
   a) means for activating said tone generating means to produce a distinctive tonal sound when said keying elements of said set are contacted in said proscribed sequence.

4. The access card of claim 3 wherein said set of keying element means is a set of buttons positioned in a recess in one edge of said access card.

5. The access card of claim 3 wherein said set of keying element means is a set of touch sensitive areas on one surface of said access card.

6. The access card of claim 3 wherein said access card is a telephone access card.

7. The access card of claim 3 wherein said access card is a credit card.

8. The access card of claim 5 wherein said access card is an autodialer including means for selective storing of telephone numbers and for storing a telephone access number.

9. The access card of claim 8 wherein said logic means includes means responsive to appropriate contacting of said touch sensitive areas to cause said tone generator means to produce tonal representations of one of the stored telephone numbers and said telephone access number in that order.

10. The access card of claim 2 wherein said logic means includes:
    a) memory means for storing said numerical signals;
    b) processor means for comparing ones of said stored numerical signals to the numerical representations produced by contacting the keying elements to determine if said keying elements were contacted in said proscribed sequence.

11. A method of accessing over a telephone an account requiring the entry of two number sequences, one of said number sequences being a personal identification number, said method comprising:
    a) providing an access card with a tone generating means within the access card for entering a tonal representation of said personal identification number into a phone;
    b) requiring contacting one or more keys on the card in a proscribed sequence to have the tone generating means produce said tonal representation, and
    c) activating said tone generating means to produce said tonal representation only if said keys have been contacted in said proscribed sequence.

12. The method of claim 11 including the steps of:
    a) counting successive failures to contact the one or more keys in the proscribed sequence; and
    b) disabling said card to prevent it from producing said tonal representation after a preset number of said successive failures.

13. The method of claim 12 including the step of activating said tone generating means to produce a distinctive tonal sound when the keys are contacted in said proscribed sequence.

14. The method of claim 13 including the step of selectively storing telephone numbers and a telephone access number in said access card.

15. The method of claim 14 including the step of causing said tone generator means to produce tonal representations of one of the stored telephone numbers and said telephone access number and said pin number in that order.

* * * * *